(12) United States Patent
Sharp et al.

(10) Patent No.: US 8,427,394 B2
(45) Date of Patent: Apr. 23, 2013

(54) SHUTTER GLASS DRIVE SCHEME FOR SEQUENTIAL-COLOR DISPLAYS

(75) Inventors: Gary D. Sharp, Beverly Hills, CA (US);
Bradley W. Walker, Dallas, TX (US)

(73) Assignee: RealD Inc., Beverly Hills, CA (US)

( * ) Notice: Subject to any disclaimer, the term of this patent is extended or adjusted under 35 U.S.C. 154(b) by 938 days.

(21) Appl. No.: 11/948,772

(22) Filed: Nov. 30, 2007

(65) Prior Publication Data
US 2008/0129900 A1 Jun. 5, 2008

Related U.S. Application Data

(60) Provisional application No. 60/861,721, filed on Nov. 30, 2006.

(51) Int. Cl.
*G02F 1/1335* (2006.01)
(52) U.S. Cl.
USPC .......... 345/7; 345/6; 345/88; 349/13; 349/15; 349/16; 348/51; 359/464; 359/465
(58) Field of Classification Search .................... 349/13, 349/15, 16; 345/6–8, 88; 348/51; 359/464–465
See application file for complete search history.

(56) References Cited

U.S. PATENT DOCUMENTS

| | | | | |
|---|---|---|---|---|
| 6,417,892 | B1 * | 7/2002 | Sharp et al. | 348/742 |
| 6,456,432 | B1 * | 9/2002 | Lazzaro et al. | 359/464 |
| 7,068,241 | B2 * | 6/2006 | Sato et al. | 345/8 |

OTHER PUBLICATIONS

International Preliminary Report on Patentability of PCT/US2007/086149 mailed Jun. 11, 2009.
International search report and written opinion in corresponding PCT/US07/86149 mailed May 2, 2008.

* cited by examiner

*Primary Examiner* — Lun-Yi Lao
*Assistant Examiner* — Sosina Abebe
(74) *Attorney, Agent, or Firm* — Baker & McKenzie LLP

(57) ABSTRACT

A method for driving at least one shutter glass lens having a property of light retardation that is variable at least according to the wavelength of the light passing through it, the shutter glass lens having an LC cell driven to a relatively "on" or a relatively "off" state according to a voltage applied across it. The lens is further operable to pass temporally modulated color display images of at least first, second, and third wavelengths being applied to a display surface, further including first, second, and third holding voltages to the LC cell in decreasing magnitude to stabilize the retardation of the lens for first, second, and third display image wavelengths.

4 Claims, 5 Drawing Sheets

SHUTTER GLASS DRIVE SCHEME FOR SEQUENTIAL-COLOR DISPLAYS

CROSS-REFERENCE TO RELATED APPLICATIONS

This disclosure claims priority to U.S. Provisional Patent Application No. 60/861,721, entitled "Shutter Glass Drive Scheme for Sequential-Color Stereoscopic-3D Displays," filed Nov. 30, 2006, which is hereby incorporated by reference herein.

BACKGROUND

1. Technical Field

This disclosure relates to 3D displays and, more specifically, to a shutter glass drive scheme for sequential-color stereoscopic-3D displays or other shutter-glass-based displays such as multifunction displays, such as shutter-glass displays for secure-viewing and dual-channel modes.

2. Background of the Related Art

Known systems for driving 3D displays and observing such 3D displays include the use of shutter glasses. Known systems lack an efficient use of the driving voltages and reaction times for the shutter glasses. There is accordingly a need for improved drive schemes for shutter glasses used in color-sequential stereoscopic-3D displays.

SUMMARY

Disclosed is a method for driving at least one shutter glass lens having a property of light retardation that is variable at least according to the wavelength light passing through it, the shutter glass lens having a Liquid Crystal (LC) cell driven to a relatively "on" or a relatively "off" state according to a voltage applied across it. The lens is further operable to pass temporally modulated color display images of at least first, second, and third wavelengths being applied to a display surface, the method comprising first, second, and third holding voltages to the LC cell in decreasing magnitude to stabilize the retardation of the lens for first, second, and third display image wavelengths.

Additional advantages, objects, and features of the disclosure will be set forth in part in the description which follows and in part will become apparent to those having ordinary skill in the art upon examination of the following or may be learned from practice of the disclosure.

BRIEF DESCRIPTION OF THE DRAWINGS

Disclosed embodiments will be described in detail with reference to the following drawings, in which like reference numerals refer to like elements, wherein.

DETAILED DESCRIPTION OF PREFERRED EMBODIMENTS

Figure 1:
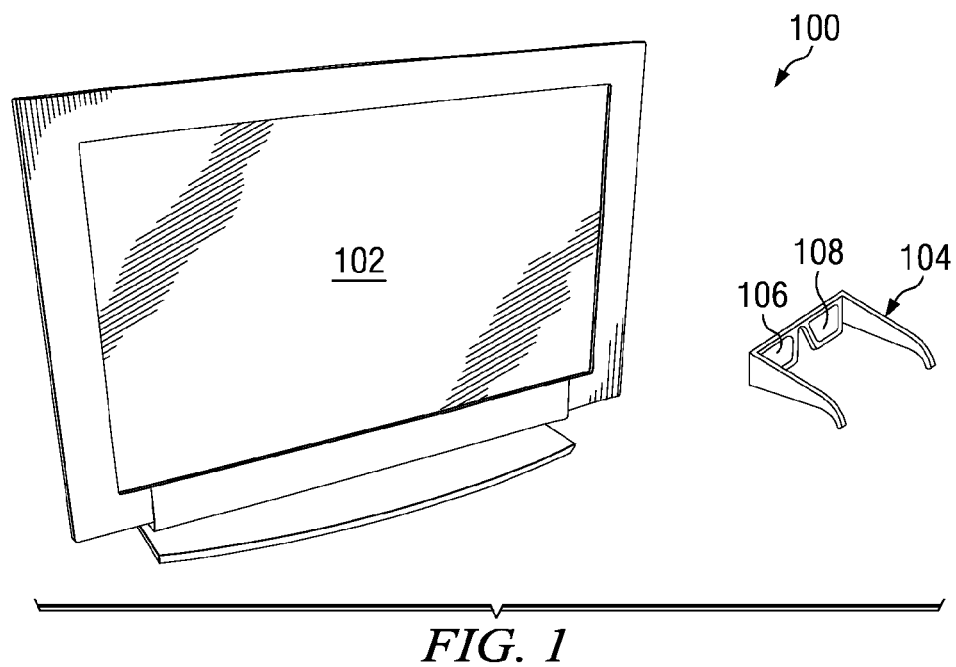
FIG. 1 is a schematic diagram illustrating an exemplary direct-view display system, in accordance with the present disclosure.

FIG. 1 is a schematic diagram illustrating an exemplary direct-view display system 100. The direct-view display system 100 includes a direct view display 102 and, for viewing some modes, eyewear 104. Stereoscopic 3D is observed using a single direct view display 102 sequentially displaying left and right perspective imagery, with synchronously operated shutter-glass eyewear 104. Eyewear or shutter-glasses 104 are typically liquid-crystal (LC) pi-cell-based shutter lenses 106 and 108.

In operation, the left lens 106 passes light, and specifically passes light from the display 102, when the display shows the left image, while the right lens 108 simultaneously blocks the light. Conversely, the right lens 108 passes light when the display 102 shows the right image, while the left lens 106 then simultaneously blocks the light.

An ideal shutter would preferably be completely transparent (i.e., would pass 100% of the incoming light) in the on-state, would be completely opaque (i.e., would pass 0% of the incoming light) in the off-state, and would have zero transition time for transitions between its on-state and off-state (and between its off-state and on-state). None of these conditions are met in practice, so a practical lens design is reached by making a number of compromises according to design choices. Many of the design decisions are made at the system level, requiring consideration for the mode in which the display operates.

An ideal display panel 102 to be used with the above-described shutter glasses 104 for sequential stereoscopic 3D would preferably provide instantaneous full-frame switching between left and right perspective imagery. Given the reality of shutter glass lenses with finite switching times, the ideal display would preferably further provide a full-frame high contrast blanking function to mitigate cross-talk. Digital-Micromirror-Display (DMD) displays provide excellent switching speeds and high contrast, and therefore such displays typically provide excellent features for use in sequential stereoscopic 3D systems. Such displays are commercially available from many Original Equipment Manufacturers (OEMs) employing Texas Instruments' Digital Light Processing® (DLP®) series DMD technology. Generally, such displays come in both single-chip (sequential color) and three-chip platforms. Single-chip platforms are common in low-cost front projectors and rear projection televisions, while the three-chip platforms are used in higher lumen projectors; particularly digital cinema.

Sequential Color DMD Systems

The present disclosure provides a scheme of shutter glass optimization for single-chip DMD systems operating in a sequential mode. DMD chips are extremely fast-switching (relative to LCD) binary electromechanical mirror arrays. Gray-level adjustments, color adjustments, resolution enhancements, and in this case, stereoscopic 3D, are all accomplished in the temporal domain. Traditionally, this involves synchronizing the DMD chip to a rotating filter wheel, which contains additive primary color segments (Red-Green-Blue or "RGB"), in some cases subtractive primary segments (Cyan-Magenta-Yellow or "CMY"), and even white or varied hues of the RGB or CMY segments. In some cases, the primary color segments are repeated two or three times on the wheel to increase field rate, which mitigates color-breakup artifacts.

Typically in such color-wheel systems there is a geometrical loss associated with "spoke-time," where the DMD chip provides a blanking function (200 microseconds or more) as the illumination spot transitions between color segments. This represents a duty-cycle loss, which is the ratio of the angular extent of the spot to the angular extent of a segment. In some cases this can be recaptured by displaying a subtractive primary image associated with the additive primaries mixed during the spoke time.

More recently, Light Emitting Diodes (LEDs) have emerged as an alternative to color-wheel modulation to enable DMD-based Rear Projection TVs. Such LED-based systems provide advantageous color-switching speeds relative to color wheel-based systems, as LEDs can switch between colors in microseconds, virtually eliminating "spoke" or transition time, thus eliminating the tradeoff between field rate and duty cycle. Additional advantages may follow from the use of LED-based systems, such as increased color gamut, potential for multi-primary illumination, longer lifetime, and ability to amplitude-modulate the source. Separately or in combination, these features can provide improved visual displays. Such advantages also apply to laser based illumination systems.

A DMD-based light modulator is operable to maximize usage of light generated by the LED modules, relative to an LCD based modulator, as it does not require polarized light. In 3D stereoscopic display modes, however, the shutter glasses must absorb at least 50% of this light due to the above described switching between left and right images. Ultimately, solid-state lasers may supplant both lamp- and LED-based light sources as the preferred illumination source for DMD-based consumer televisions.

Laser-implemented television designs have the potential to provide the superior brightness and color saturation. Lasers further deliver a polarized output, which for a 3D stereoscopic display may be "preserved" in order to avoid the 50% loss normally occurring at the shutter glass lens.

Methods and systems are disclosed herein for optimum shutter-glass operation with a single DMD chip which maximizes light throughput. In addition to avoiding shutter-glass light losses that would otherwise be associated with 3D stereoscopic shutter-glass implementations, the optimized drive-schemes described herein are suitable to enable multi-functional displays that include stereoscopic 3D capabilities as well as secure-viewing and dual-channel modes.

The so-called secure-viewing mode involves the generation of a second image, derived from a primary image, such that the screen appears content-free when viewed without shutter glasses. Alternatively, the second image can be derived to display unrelated content, or a message, such as "secure mode." In this mode, the shutter glasses would only "open" during the primary image viewing times, allowing secure viewing of images.

The dual-channel mode involves sequential display of two independent video images. User 1 wears shutter glasses that open only during even frames, and User 2 wears shutter glasses that open only during odd frames. This mode can be used to allow viewers to watch different channels on the same television. It can also be used in a gaming environment, such that Player 1 and Player 2 can view imagery from their unique perspective, or confidential information superimposed on a common video image.

Shutter Lens Design

Figure 2:
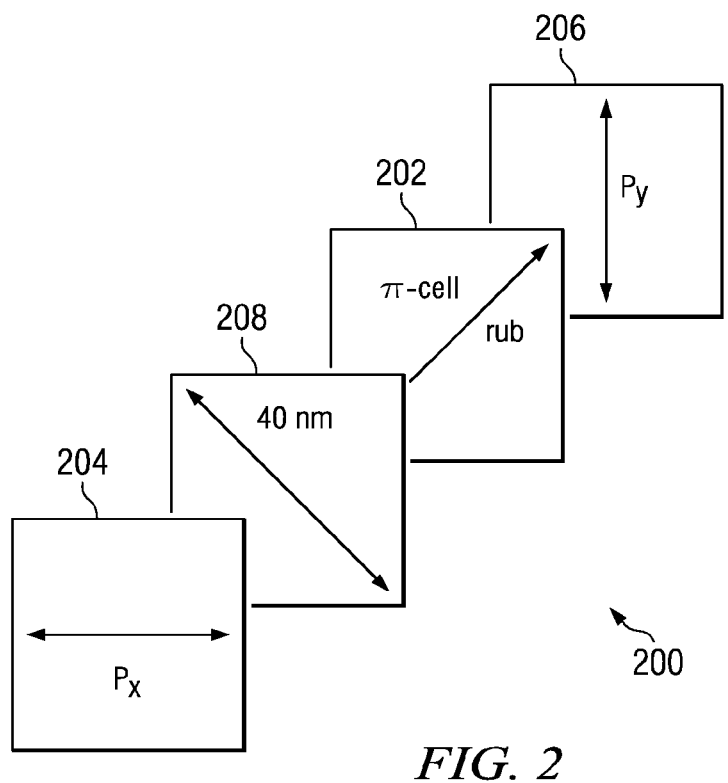
FIG. 2 is a schematic diagram illustrating an exemplary pi-cell shutter, in accordance with an embodiment of the present disclosure.

FIG. 2 is a schematic diagram illustrating an exemplary pi-cell shutter device 200. Shutter lens 200 includes a liquid crystal pi-cell 202, rubbed at 45°, sandwiched between a 0° crossed polarizer 204 and a 90° crossed polarizer 206. Additional retardation films 208 are frequently used to enhance the contrast, for instance, by minimizing the residual retardation of the pi-cell in the energized state. In an exemplary embodiment, retardation film 208 may provide roughly 40 nm of retardation orthogonal to the rubbing direction. With this compensation, the cell may use roughly 19V to minimize the net in-plane retardation, maximizing the contrast. Such an arrangement emphasizes contrast, as the pi-cell 202 is least chromatic in the energized or "off" state.

Typically, the off-state of an LC shutter is generated when the LC molecules (effective optic axis) are oriented along the direction of normally incident light (regardless of LC recipe and drive scheme), and the bounding polarizers 204, 206 are crossed. In the event that all molecules cannot be oriented along this z-direction, a polarization transformation occurs on normally incident light, which limits contrast. This is generally termed "residual in-plane retardation." In a typical pi-cell configuration, uncorrected residual in-plane retardation can limit contrast to less than 50:1 at normal incidence. The above contrast ratio further depends upon being able to use the maximum available drive voltage.

Given the above, the on-state is given by the chromatic response of a (dispersive) zero-order half-wave retarder. This occurs when the pi-cell 202 is in the low-voltage state, providing half-wave retardation at a wavelength selected to maximize the conversion of polarization to the orthogonal state. The optimum voltage is frequently selected to maximize system level color-corrected lumens. At all other wavelengths, however, the output state of polarization is elliptical, resulting in additional throughput loss due to the need to polarization-filter the output light for sequential stereoscopic modulation.

Figure 3:
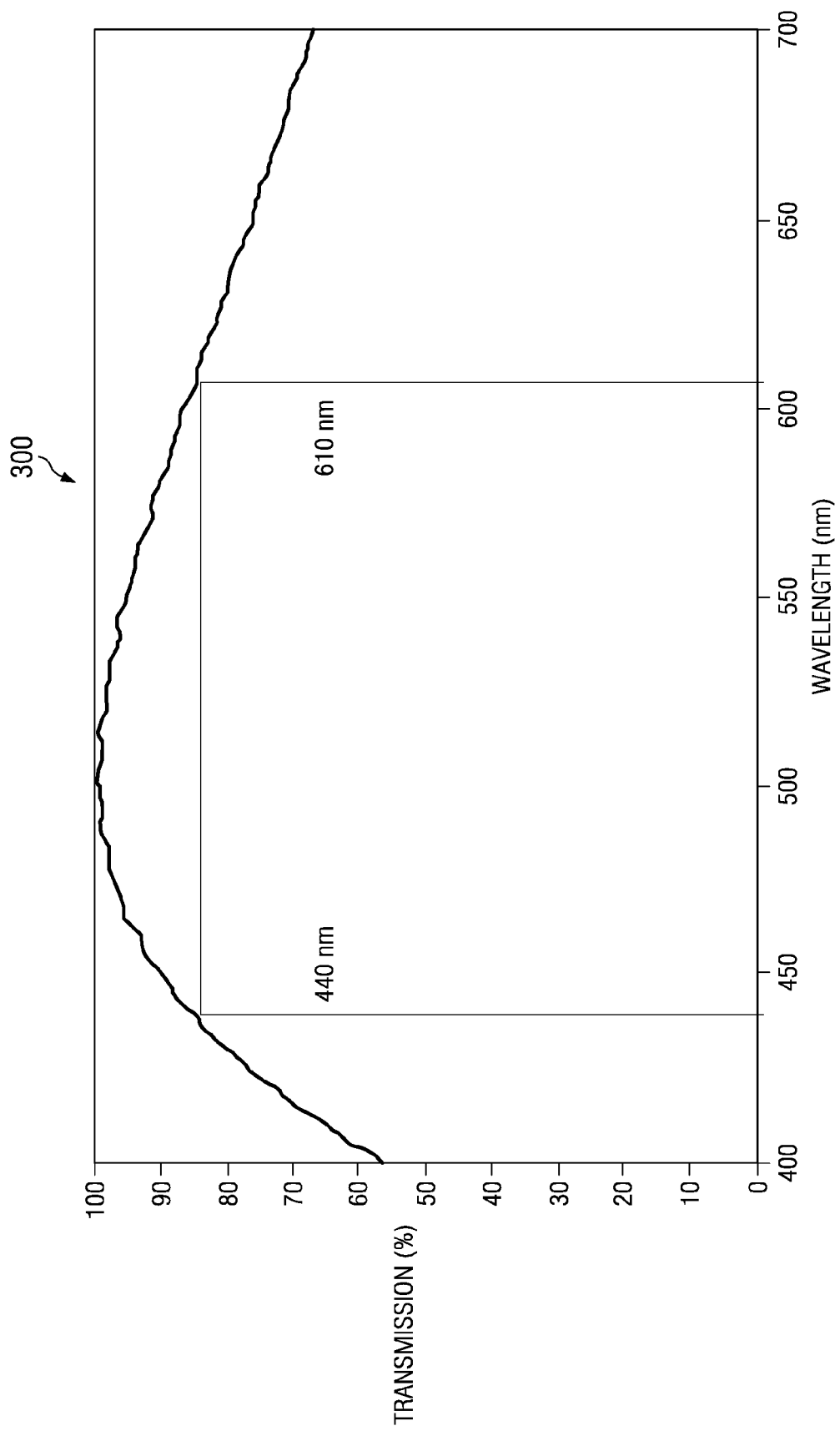
FIG. 3 is a plot of the on-state spectral transmission of a half-wave LC retarder designed to peak in the cyan portion of the spectrum.

FIG. 3 is a graph 300 showing a transmission characteristic of a chromatic half-wave retarder in the on-state against wavelength for the visible spectrum. Graph 300 shows that such a device selected to peak in the cyan portion of the spectrum can exhibit a transmission loss of 15% in the blue/red portions of the spectrum. This loss is independent of polarizer insertion loss, representing only the loss due to the dispersive retardation of the LC device.

There are several factors that tend to determine overall shutter insertion loss. All of the following losses are in addition to the 50% or more loss associated with the generation of 3D using the sequential scheme. First, the main loss contributor in a DMD-based system is the initial 50% loss required to polarize the shutter lens input. The second contributor is the insertion loss from the pair of sheet polarizers 204, 206. Internal transmission in the green can be as high as 95% from one polarizer, but can drop to about 85% in the blue, giving a total blue loss of 28% (0.85*0.85=0.7225→~28% cumulative loss from both polarizers). Color balancing a blue-starved display in 3D mode, can thus have a significant impact. Third, the LC transmission mode has significant chromaticity, as discussed above. Fourth, ITO (Indium Tin Oxide, which is the typical conductor for LC cells) absorption/reflection of light can cause an additional loss of several percent. Fifth, a lack of antireflection coatings on the LC cell and polarizers can typically result in an additional 8% loss.

Transient Response of pi-cell Shutters

As discussed above, there is a greater than fifty percent loss associated with the sequential nature of the 3D system. The extent to which this loss exceeds 50% depends in part upon the turn-off and turn-on transition times of the shutter-glass lenses. Should a shutter remain partially open when displaying an image intended for the opposite eye, undesired "ghost imagery" will be observable that detracts from the 3D quality.

To avoid "ghost imagery," the DMD is "blanked" by applying a uniform blanking state to all of its mirrors in advance of switching the shutter lenses 200. This blanking interval is chosen to exceed the time required for a shutter to transition from the on-state to the fully off-state—with the blanking beginning just before the transition and ending just after the transition—to avoid cross-talk. It is possible, however, to display imagery in one lens during the time that the other lens is making the transition from the off-state to the on-state. In the event that this is not done, the additional light loss is given as the ratio of shutter lens turn-on time to total field duration.

In typical pi-cells, shutters are normally white and are driven to the low birefringence state (or off-state). This transition is generally relatively fast, but depends upon electric field level. With sufficiently high field, and a fast LC cell recipe, this transition can occur in approximately 100 microseconds at room temperature. This is normally less than the spoke-time of a color wheel.

When the field is removed, the LC molecules relax to the on-state director profile. The response time again depends upon the details of the cell recipe. It further depends upon wavelength and operating temperature. A well-designed pi-cell can relax to the half-wave retardation state in the green band, for example, at room temperature in approximately 1 ms (0-99%). This relaxation time significantly exceeds the spoke-time of a color wheel, resulting in additional duty-cycle loss in 3D mode for such systems.

The pi-cell shutter operates in variable-birefringence mode. The time-dependent pi-cell transmission can be expressed by:

$$T(t)=\sin^2[\Gamma(t,V,\lambda)/2],$$

where $\Gamma$ is the time/voltage/wavelength dependent retardation of the cell, given by $$\Gamma=2\pi\Delta n(t,V,\lambda)d/\lambda,$$

where, $\Delta n(t, V, \lambda)$ is the time/voltage/wavelength dependent birefringence, d is the cell gap, and $\lambda$ is the wavelength.

This shows that the peak (half-wave) transmission wavelength can be selected by the proper application of the corresponding driving voltage (V). When the field is removed, the cell will accumulate in-plane retardation, such that the peak transmission wavelength will shift through the visible light spectrum from shortest to longest wavelength (or blue through red).

The variable birefringence of the LC shutter as described above can be used to capitalize on the sequential color operation of the DMD engine. That is, the on-state voltage of the shutter is tuned to maximize the transmission of the displayed color. As a pi-cell is a variable retarder, a blue-shift in the peak transmission wavelength is accomplished by increasing the holding voltage, with a red-shift occurring with decreased holding voltage.

In the shutter-glass driving method described herein, three temporal methods may be used to maximize the throughput of a single-chip-DMD-engine-driven display being viewed with pi-cell-based shutter glasses:

1. Insert a zero-volt interval between the off-state and on-state voltages
2. Present the colors in a sequence from short wavelength to long wavelength, and
3. Tune the on-state voltage to maximize the throughput of the displayed color.

Item 1 refers to the insertion of a zero-volt interval directly following the off-state voltage. By removing the field, the LC director profile can be restored as quickly as possible. Once the desired profile is achieved, representing the half-wave retardation of the appropriate wavelength, a holding voltage is applied to stabilize the state.

As described in Item 2 above, the color selection is chosen to begin with the shortest wavelength (blue), and to progress sequentially through the spectrum (e.g., blue, cyan, green, yellow, red, depending on the color bands used). By displaying blue first, the turn-on time is just that required to accumulate a half-wave of retardation at the shortest wavelength. This is again done to minimize blanking time necessary to avoid cross-talk, thus maximizing the duty cycle.

For a particular cell design, accumulating 220 nm of retardation required to maximize the transmission of 440 nm light could take 400 microseconds, while the 310 nm of retardation required to maximize the transmission of 620 nm light could take 1,600 microseconds. Note that this is due in part to the significant birefringence dispersion typical of fluids used in pi-cells. The specific chromatic response time depends upon the details of the cell gap, the LC fluid (and temperature), and to some degree the pretilt.

Item 3 refers to the tuning of the low voltage state to optimize the transmission of the displayed color. When making the transition from shortest to longest wavelength, this holding voltage will be reduced incrementally when switching between each field. Note that this transition time is generally of lesser importance than the initial transition from off-state to the blue on-state, as there are no cross-talk implications. Nevertheless, in a more sophisticated drive scheme, zero-volt intervals can be inserted at each transition to maximize switching speed between optimized retardation values for each field.

The above-described items can be used separately or together, and can be used advantageously in color-wheel-, LED-module-, and solid-state-laser-based driving DMD systems. The techniques disclosed herein could also be used advantageously in other modulations systems such as LCD, LCoS, and spatial light modulation systems in addition to DMD, depending on such modulation system's ability to provide the requisite switching speeds for 3D or other shutter-glass-based display applications.

Figure 4:
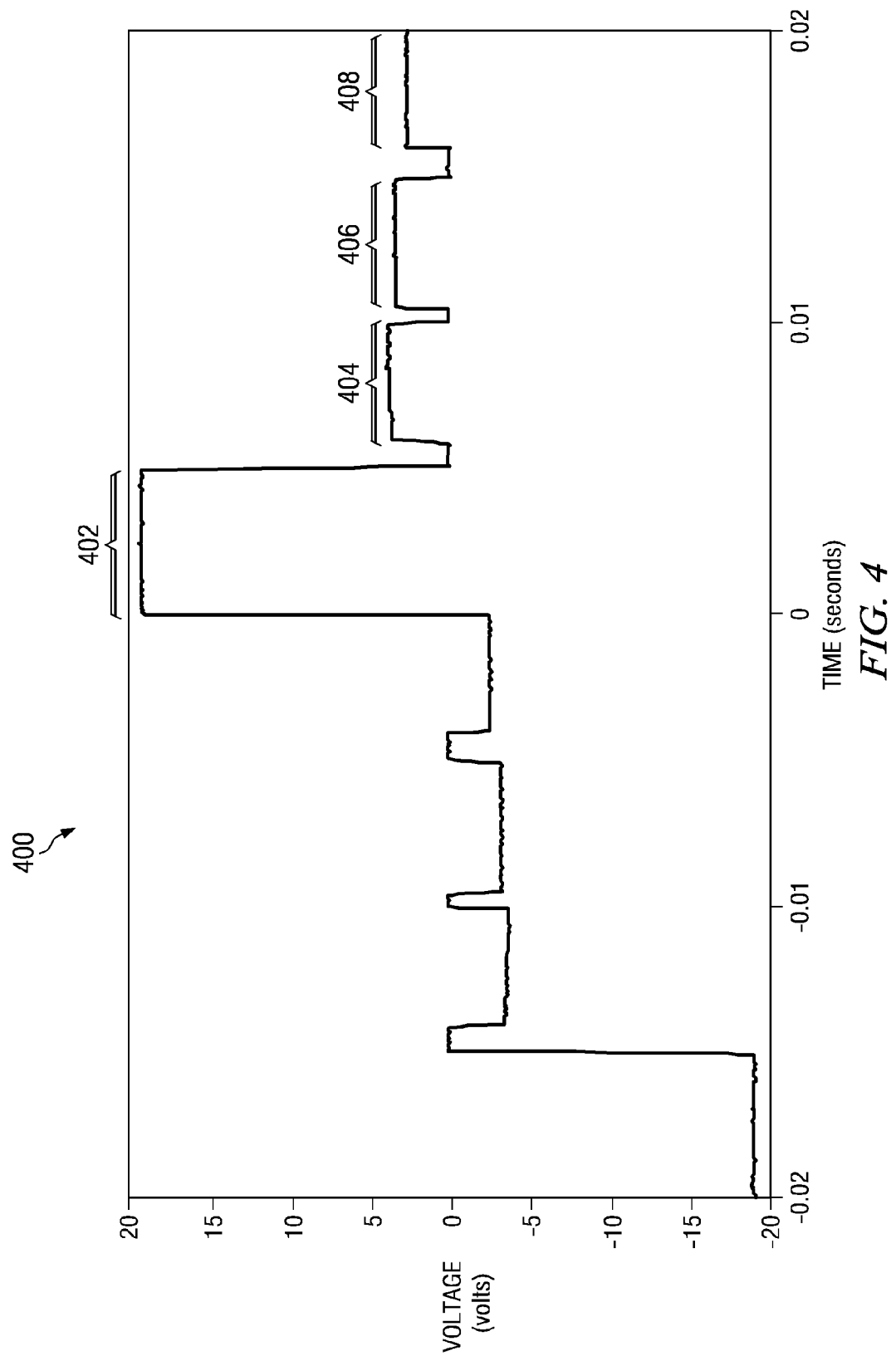
FIG. 4 is a plot of a measured drive waveform used to optimize throughput in a sequential color system, in accordance with an embodiment of the disclosure.

FIG. 4 is a graph 400 showing a measured drive waveform on a voltage against time scale. Graph 400 illustrates three techniques described above for optimizing throughput in a sequential color system.

Figure 5:
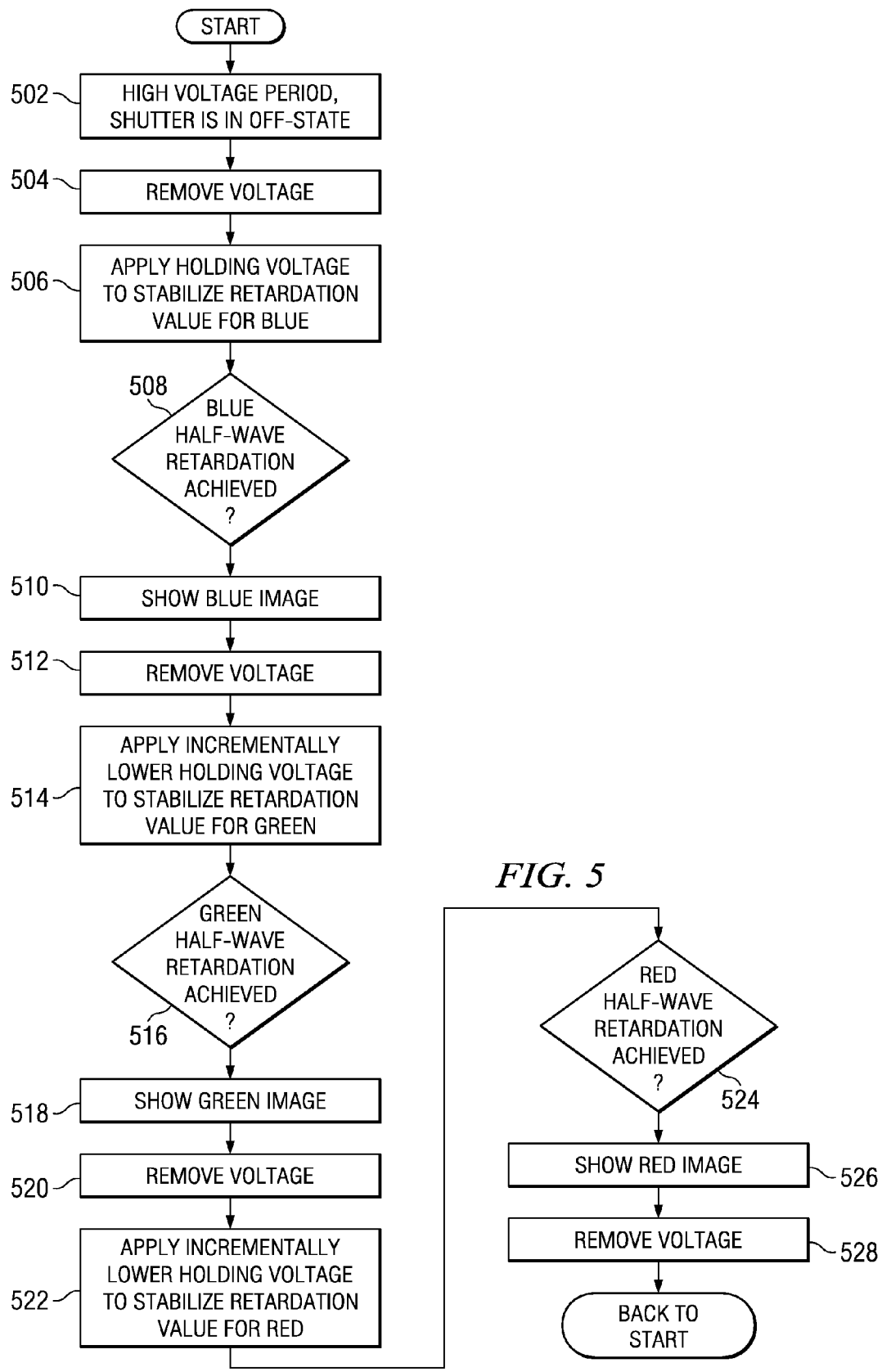
FIG. 5 is a flowchart showing a shutter glass drive method, in accordance with an embodiment of the present disclosure.

FIG. 5 is a flow diagram 500 of an exemplary sequence consistent with the drive waveform of FIG. 4. For instance, during the high voltage period 402, the shutter is in the off-state (502). The voltage is then removed entirely (504), then the holding voltage 404 is applied to stabilize the retardation value (504) until the blue half-wave retardation is achieved (506). After the blue image is shown (510), the voltage is again removed (512), with an incrementally lower holding voltage 406 applied (514) to stabilize the optimized green half-wave retardation (516). Finally, after the green image is shown (518), the voltage is again removed (520), with an incrementally lower holding voltage 408 applied (522) to stabilize the optimized half-wave retardation in the red (522) to provide an appropriate red half-wave retardation (524). The red image is shown (526). The voltage may then be removed (528), and the sequence may continue.

With each change in voltage level in the above-described driving method, there is applied a 0-volt interval between driving intervals to maximize switching speed. There are at least three holding voltage levels, corresponding to optimized blue, green and red retardation values, respectively. This sequence can be repeated if there are additional RGB color wheel segments, and/or if there are subtractive primary color segments.

Figure 6:
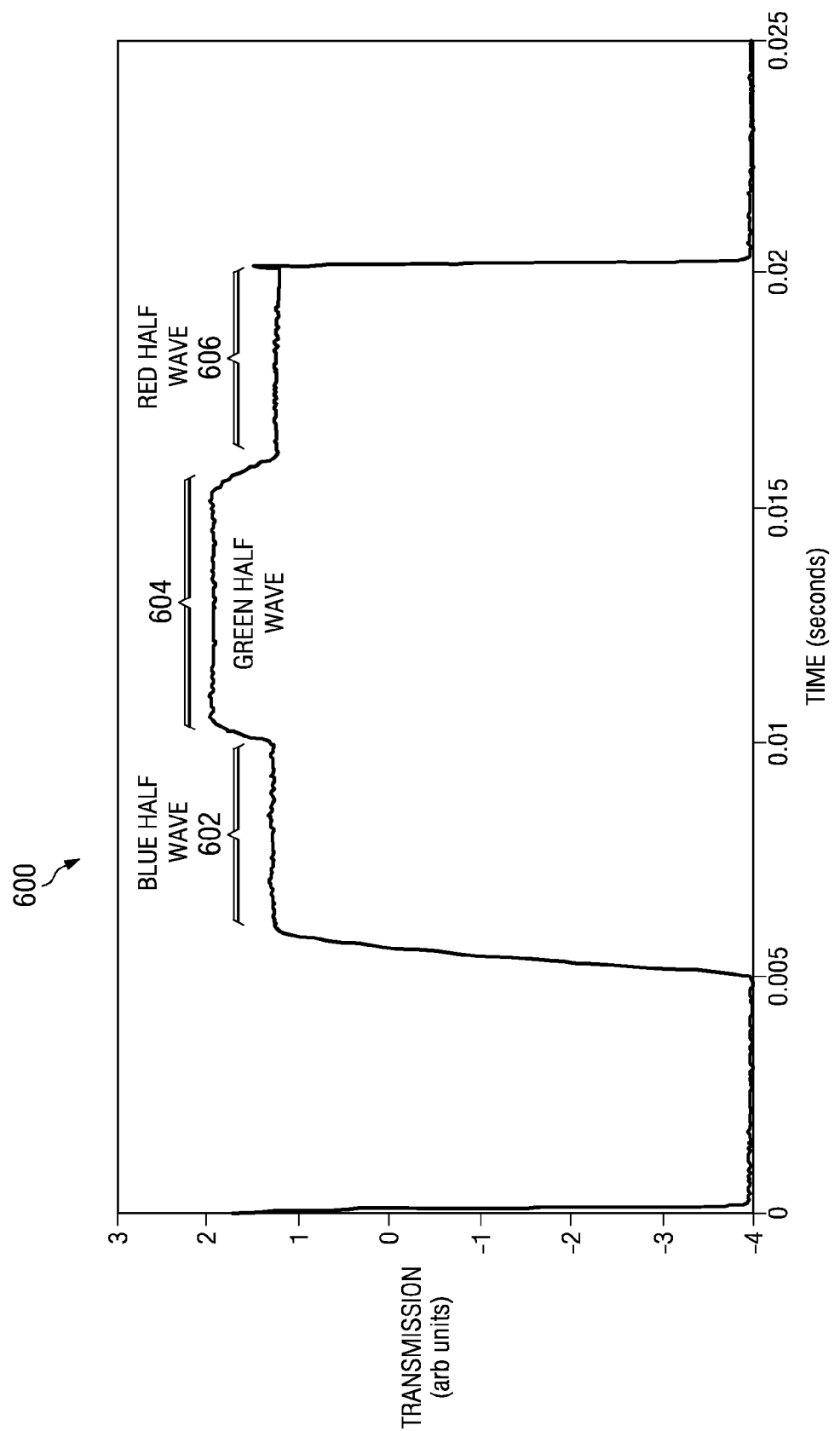
FIG. 6 is a plot of the optical response (transmission spectrum) of the pi-cell shutter device of FIG. 3 when the waveform of FIG. 4 is used to drive the device.

FIG. 6 shows the optical response 600 measured on the oscilloscope to the waveform 400 of FIG. 4. With a 19V square-wave signal, the "turn-on" field is sufficient to switch all wavelengths from 100% to 1% in approximately 100 microseconds in certain LC pi-cells. When the field is removed in the turn-off condition, however, the time to achieve half-wave retardation is strongly wavelength-dependent. In the system from which the illustrated optical response is generated, a single (green) wavelength is input to the shutter with the amplitude monitored on an oscilloscope. The output shows three levels, the first and third of which are approximately the same transmission level. The first level 602, corresponding to the optimized blue retardation, shows reduced amplitude in the green because the retardation is insufficient to fully switch green. The third level 606, corresponding to the optimized red retardation, shows reduced amplitude in the green because the retardation is, in this case, excessive. The second level 604 corresponds to the optimum retardation value necessary to maximize green transmission. Note that the shutter is DC-balanced by alternately supplying positive- and negative-going waveforms, with no consequence to the optical response.

While the curve of FIG. 6 verifies that three retardation values can be selected corresponding to the displayed color, it should be noted that the rise-time curves correspond to the response in the green, which is not representative of the actual anticipated performance for all wavelengths. When the response time of the shutter is measured in the specific bands, the results are as follows for 0-99% transmission:

Blue: 400 microseconds,
Green: 1,100 microseconds, and
Red: 1,600 microseconds.

The switching of the pi-cell retardation value occurs when changing between colors. In this test, only green is used, but if the blue light was turned on instead, the rise time would have been about three times faster (1100/400). Because only green is used in this test, the initial turn-on time of the LC pi-cell lens is roughly ⅓ of that shown in the scope trace.

In the absence of these three techniques, response times are greatly increased. Consider the case in which the sequence R, G, B is presented to the shutter glasses. Here, a full 1,600 microseconds of blanking time is required before the red transmission is fully stabilized, which would significantly increase if a zero-volt interval is not included. Typically, the zero-volt interval has the effect of halving the response time. Using a two-level drive scheme, it is likely that the red would be clipped by applying the holding voltage for the following color, green, after a suitable time. This helps the red response time by stabilizing the shutter response, but also limits the red transmission. Since UHP-based projectors tend to be red-starved, such red loss has direct throughput consequences at the system level. Accordingly, the above-described driving scheme provides a significant advantage over a system not employing the techniques described herein.

The foregoing embodiments and advantages are merely exemplary, and are not to be construed as limiting the present invention. The present teaching can be readily applied to other types of apparatuses. The description of the present invention is intended to be illustrative. Many alternatives, modifications, and variations will be apparent to those skilled in the art. Various changes may be made without departing from the spirit and scope of the present invention.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. A method for driving at least one shutter glass lens having a property of light retardation that is variable at least according to the wavelength of the light passing through it, the shutter glass lens having an LC cell driven to a relatively "on" or a relatively "off" state according to a voltage applied across it, the lens operable to pass temporally modulated color display images of at least first, second, and third wavelengths being applied to a display surface, the method comprising:

a) applying a first holding voltage to the LC cell to stabilize the retardation of the lens for the first wavelength;
b) providing a first temporally modulated color display image on the display surface after applying the first holding voltage;
c) applying a second holding voltage to the LC cell to stabilize the retardation of the lens for the second wavelength;
d) providing a second temporally modulated color display image on the display surface after applying the second holding voltage;
e) applying a third holding voltage to the LC cell to stabilize the retardation of value for the third wavelength;
f) providing a third temporally modulated color display image on the display surface after applying the third holding voltage; and
g) between applying the holding voltages, removing voltage from the LC cell;

wherein the removing voltage and the applying the first, second, and third holding voltages occur during the relatively "on" state.

2. The method according to claim 1, wherein the above process begins from a starting point of the shutter lens being in an "off" state with the LC cell having a voltage applied to it that is greater than all of the first, second, and third holding voltages.

3. The method according to claim 2, wherein the first, second, and third holding voltages have sequentially decreasing magnitudes.

4. The method according to claim 1 wherein the first wavelength is blue, the second wavelength is green, and the third wavelength is red.

* * * * *